United States Patent
Devarasetty (10) Patent No.: US 10,542,443 B2
(45) Date of Patent: Jan. 21, 2020

(54) METHODS, SYSTEMS, AND COMPUTER READABLE MEDIA FOR TESTING LONG TERM EVOLUTION (LTE) AIR INTERFACE DEVICE USING EMULATED NOISE IN UNASSIGNED RESOURCE BLOCKS (RBS)

(71) Applicant: Keysight Technologies, Inc., Minneapolis, MN (US)

(72) Inventor: Prasada Rao Devarasetty, Cary, NC (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 0 days.

(21) Appl. No.: 15/796,563

(22) Filed: Oct. 27, 2017

(65) Prior Publication Data
US 2019/0132753 A1    May 2, 2019

(51) Int. Cl.
*H04W 24/06*      (2009.01)
*H04B 17/391*     (2015.01)
(Continued)

(52) U.S. Cl.
CPC ........ *H04W 24/06* (2013.01); *H04B 17/0085* (2013.01); *H04B 17/17* (2015.01);
(Continued)

(58) Field of Classification Search
CPC .. H04B 17/16; H04B 17/309; H04B 17/3912; H04B 17/0085; H04B 17/17;
(Continued)

(56) References Cited

U.S. PATENT DOCUMENTS 5,465,393 A * 11/1995 Frostrom .............. H04W 24/06
                                                                                 333/109
5,530,917 A    6/1996 Andersson et al.
(Continued)

FOREIGN PATENT DOCUMENTS

CN        109347667 A    2/2019
EP        2 262 134 A2   12/2010
(Continued)

OTHER PUBLICATIONS

Communication of the extended European search report for European Application No. 14857488.2 (dated May 16, 2017).
(Continued)

*Primary Examiner* — Nathan S Taylor (57) ABSTRACT

A method for testing an air interface device using emulated noise in unassigned uplink resource blocks (RBs) includes, in a network equipment test device including at least one processor, receiving a first downlink signal transmission from an air interface device under test. The method further includes identifying unassigned uplink resource blocks. The method further includes transmitting an uplink signal to the air interface device under test with emulated channel noise in at least one of the unassigned uplink resource blocks. The method further includes receiving, after transmission of the uplink signal to the air interface device under test, a subsequent downlink signal transmission from the air interface device under test. The method further includes determining an effect of the emulated channel noise on resource block assignments.

20 Claims, 6 Drawing Sheets

US 10,542,443 B2

Page 2

(51) Int. Cl.
*H04L 5/00* (2006.01)
*H04B 17/00* (2015.01)
*H04B 17/17* (2015.01)
*H04L 1/00* (2006.01)
*H04W 88/02* (2009.01)

(52) U.S. Cl.
CPC ....... *H04B 17/3912* (2015.01); *H04L 5/0094* (2013.01); *H04L 1/0042* (2013.01); *H04W 88/02* (2013.01)

(58) Field of Classification Search
CPC ..... H04L 1/0026; H04L 1/0028; H04L 1/243; H04L 27/2601; H04L 43/50; H04L 63/1466; H04L 1/0042; H04L 5/0094; H04W 24/06; H04W 88/02
USPC ............................ 370/329, 252; 455/67.11
See application file for complete search history.

(56) References Cited

U.S. PATENT DOCUMENTS

| | | |
|---|---|---|
| 5,539,749 A | 7/1996 | Eul |
| 5,596,570 A | 1/1997 | Soliman |
| 5,867,791 A | 2/1999 | Chambert |
| 6,018,521 A | 1/2000 | Timbs et al. |
| 6,163,547 A | 12/2000 | De Vriendt et al. |
| 6,292,667 B1 | 9/2001 | Wallentin et al. |
| 6,308,065 B1 | 10/2001 | Molinari et al. |
| 6,374,112 B1 | 4/2002 | Widegren et al. |
| 6,445,683 B1 | 9/2002 | Nobuyasu et al. |
| 6,456,675 B2 | 9/2002 | Wagner et al. |
| 6,466,556 B1 | 10/2002 | Boudreaux |
| 6,490,315 B2 | 12/2002 | Katz et al. |
| 6,519,461 B1 | 2/2003 | Andersson et al. |
| 6,587,457 B1 | 7/2003 | Mikkonen |
| 6,594,240 B1 | 7/2003 | Chuah et al. |
| 6,594,241 B1 | 7/2003 | Malmlöf |
| 7,558,565 B2 | 7/2009 | Miller et al. |
| 8,019,385 B1 | 9/2011 | Mansour et al. |
| 8,050,338 B2 | 11/2011 | Wilhelmsson |
| 8,781,797 B1 | 7/2014 | Oltman et al. |
| 8,929,294 B2 | 1/2015 | Devarasetty et al. |
| 8,937,882 B2 | 1/2015 | Devarasetty |
| 9,351,186 B2 | 5/2016 | Devarasetty et al. |
| 9,432,859 B2 | 8/2016 | Devarasetty et al. |
| 9,444,561 B2 | 9/2016 | Devarasetty et al. |
| 9,596,166 B2 | 3/2017 | Iyer et al. |
| 9,661,513 B2 | 5/2017 | Devarasetty |
| 10,142,865 B2 | 11/2018 | Devarasetty |
| 10,182,355 B1 | 1/2019 | Yan et al. |
| 2002/0012380 A1 | 1/2002 | Hottinen et al. |
| 2002/0021698 A1 | 2/2002 | Lee et al. |
| 2002/0183053 A1 | 12/2002 | Gopalakrishna et al. |
| 2003/0100299 A1* | 5/2003 | Ko .......................... H04L 41/00 455/423 |
| 2003/0228853 A1* | 12/2003 | Kazakevich ........... H03G 3/001 455/136 |
| 2004/0196804 A1* | 10/2004 | Love ................. H04W 56/0045 370/329 |
| 2004/0214564 A1 | 10/2004 | Rosen et al. |
| 2005/0130645 A1* | 6/2005 | Albert Dobson ....... H04L 41/00 455/423 |
| 2006/0012388 A1 | 1/2006 | Lin et al. |
| 2006/0122814 A1* | 6/2006 | Beens ................. G06F 15/7864 702/189 |
| 2006/0229018 A1 | 10/2006 | Mlinarsky et al. |
| 2006/0234636 A1 | 10/2006 | Miller et al. |
| 2006/0258320 A1 | 11/2006 | Huang |
| 2006/0262880 A1 | 11/2006 | Mizuta et al. |
| 2007/0116046 A1 | 5/2007 | Liu et al. |
| 2008/0147370 A1* | 6/2008 | Sjerling ............. H04B 17/0087 703/13 |
| 2008/0310490 A1* | 12/2008 | Jitsuno ............... G01R 31/2841 375/227 |
| 2009/0046569 A1 | 2/2009 | Chen et al. |
| 2009/0083234 A1 | 3/2009 | Yeom et al. |
| 2009/0163212 A1 | 6/2009 | Hall et al. |
| 2009/0196244 A1 | 8/2009 | Chun et al. |
| 2009/0268828 A1 | 10/2009 | Roberts |
| 2010/0004015 A1* | 1/2010 | Nilsson ................. H04L 1/0025 455/522 |
| 2010/0075678 A1* | 3/2010 | Akman ................. H04W 24/06 455/436 |
| 2010/0291940 A1 | 11/2010 | Koo et al. |
| 2010/0331030 A1 | 12/2010 | Nory et al. |
| 2011/0053516 A1* | 3/2011 | Harteneck ............... H04L 1/243 455/67.11 |
| 2011/0142115 A1 | 6/2011 | Wang et al. |
| 2011/0217937 A1* | 9/2011 | Cook ................. H04B 17/0085 455/67.14 |
| 2011/0270567 A1 | 11/2011 | Mow et al. |
| 2011/0287721 A1 | 11/2011 | Haran |
| 2011/0299570 A1 | 12/2011 | Reed |
| 2011/0310745 A1 | 12/2011 | Goria et al. |
| 2012/0014333 A1 | 1/2012 | Ji et al. |
| 2012/0100813 A1* | 4/2012 | Mow ...................... H04B 17/12 455/67.12 |
| 2012/0121038 A1 | 5/2012 | Liu et al. |
| 2012/0269143 A1 | 10/2012 | Bertrand et al. |
| 2012/0269278 A1* | 10/2012 | Onggosanusi ......... H04B 7/024 375/267 |
| 2012/0309323 A1 | 12/2012 | Guo et al. |
| 2013/0010724 A1 | 1/2013 | Han et al. |
| 2013/0040683 A1 | 2/2013 | Siomina et al. |
| 2013/0044610 A1 | 2/2013 | Zhao et al. |
| 2013/0058219 A1* | 3/2013 | Liu ....................... H04W 24/06 370/241 |
| 2013/0058240 A1 | 3/2013 | Kim et al. |
| 2013/0058306 A1 | 3/2013 | Noh et al. |
| 2013/0070690 A1 | 3/2013 | Moon et al. |
| 2013/0088973 A1 | 4/2013 | Yang et al. |
| 2013/0143503 A1 | 6/2013 | Li et al. |
| 2013/0155872 A1 | 6/2013 | Subramanian et al. |
| 2013/0155878 A1 | 6/2013 | Deng et al. |
| 2013/0184023 A1 | 7/2013 | Asokan et al. |
| 2013/0208603 A1 | 8/2013 | Choi et al. |
| 2013/0235727 A1 | 9/2013 | Campbell et al. |
| 2013/0303089 A1 | 11/2013 | Wang et al. |
| 2014/0119213 A1 | 5/2014 | Devarasetty |
| 2014/0140271 A1 | 5/2014 | Devarasetty et al. |
| 2014/0321303 A1* | 10/2014 | Iyer ......................... H04L 43/50 370/252 |
| 2014/0341052 A1 | 11/2014 | Devarasetty et al. |
| 2015/0023290 A1 | 1/2015 | Tang et al. |
| 2015/0031310 A1 | 1/2015 | Devarasetty et al. |
| 2015/0117225 A1 | 4/2015 | Devarasetty et al. |
| 2016/0366604 A1 | 12/2016 | Devarasetty |
| 2017/0311186 A1 | 10/2017 | Devarasetty |
| 2018/0034559 A1* | 2/2018 | Foegelle ............ H04B 17/0087 |
| 2018/0293338 A1* | 10/2018 | Braun ................. H04W 16/18 |

FOREIGN PATENT DOCUMENTS

| | | |
|---|---|---|
| EP | 2262134 A2 | 12/2010 |
| EP | 2330843 A1 | 6/2011 |
| EP | 2533572 A1 | 12/2012 |
| EP | 2 989 820 B1 | 1/2018 |
| EP | 2 997 679 B1 | 8/2018 |
| EP | 3 063 887 B1 | 4/2019 |
| GB | 2511696 B | 1/2017 |
| JP | 2009-065488 A | 3/2009 |
| JP | 2011-193124 A | 9/2011 |
| KR | 10-2000-0072934 A | 12/2000 |
| KR | 10-2008-0066321 A | 7/2008 |
| KR | 10-2011-0085274 A | 7/2011 |
| KR | 10-2011-0112502 A | 10/2011 |
| WO | WO 02/098151 A1 | 12/2002 |
| WO | WO 2006/048742 A1 | 5/2006 |
| WO | WO 2012/117147 A1 | 9/2012 |
| WO | WO 2012/150894 A1 | 11/2012 |
| WO | WO 2013/096585 A1 | 6/2013 |
| WO | WO 2014/176376 A1 | 10/2014 |

(56) References Cited

FOREIGN PATENT DOCUMENTS

| WO | WO 2014/186747 A1 | 11/2014 |
|---|---|---|
| WO | WO 2015/017082 A1 | 2/2015 |
| WO | WO 2015/065900 A1 | 5/2015 |

OTHER PUBLICATIONS

Communication of the extended European search report for European Application No. 14832004.7 (dated Feb. 8, 2017).
Communication of European publication number and information on the application of Article 67(3) EPC for European Application No. 14857488.2 (dated Aug. 10, 2016).
Supplemental Notice of Allowability for U.S. Appl. No. 14/049,193 (dated Jul. 18, 2016).
Communication of European publication number and information on the application of Article 67(3) EPC for European Application No. 14832004.7 (dated May 11, 2016).
Notice of Allowance and Fee(s) Due for U.S. Appl. No. 14/069,215 (dated Apr. 29, 2016).
Notice of Allowance and Fee(s) Due & Applicant-Initiated Interview Summary for U.S. Appl. No. 14/049,193 (dated Apr. 5, 2016).
"Rayleigh fading," Wikipedia, https://en.wikipedia.org/wiki/Rayleigh_fading, pp. 1-5 (Jan. 29, 2016).
Final Office Action for U.S. Appl. No. 14/069,215 (dated Dec. 22, 2015).
Final Office Action for U.S. Appl. No. 14/049,193 (dated Dec. 10, 2015.
Non-Final Office Action for U.S. Appl. No. 14/049,193 (dated Jun. 30, 2015).
Non-Final Office Action for U.S. Appl. No. 14/069,215 (dated Apr. 29, 2015).
Notification of Transmittal of the International Search Report and the Written Opinion of the International Searching Authority, or the Declaration for International Application No. PCT/US2014/062399 (dated Jan. 20, 2015).
Notification of Transmittal of the International Search Report and the Written Opinion of the International Searching Authority, or the Declaration for PCT International Application No. PCT/US2014/045647 (dated Nov. 5, 2014).
Zhong et al., "The MITRE Tactical Channel Emulation System," The MITRE Corporation, Case 13-1750 (May 2013).
Sur et al, "Doppler Shift Impact on the MIMO OFDM System in Vehicular Channel Condition," I.J. Information Technology and Computer Science, vol. 8, pp. 57-62 (2012).
Notice of Allowance and Fee(s) Due for U.S. Appl. No. 14/735,083 (dated Jan. 18, 2017).
Intention to Grant under Section 18(4) for Great Britain Patent Application No. 1411056.3 (dated Dec. 22, 2016).
Notice of Allowance and Fee(s) Due for U.S. Appl. No. 13/668,203 (dated Sep. 8, 2014).
Notice of Allowance and Fee(s) Due for U.S. Appl. No. 13/682,663 (dated Sep. 8, 2014).
Non-Final Office Action for U.S. Appl. No. 13/668,203 (dated Apr. 29, 2014).
Notification Concerning Availability of the Publication of the International Application for PCT International Application No. PCT/US2012/070877 (dated Jun. 27, 2013).
Isanjole, "WaveJudge 4900A LTE Analyzer," Isanjole, pp. 1-2 (Feb. 2012).
Fraser, "LTE Channel State Information (CSI)," Agilent Technologies, pp. 1-66 (Copyright 2012).
Rohde & Schwarz, "R & S® TS 8980 test system analyzes LTE quality indicators: CQI, PMI and RI," NEWS 203/11, pp. 6-9 (2011).
Decision to grant a European patent pursuant to Article 97(1) EPC for European Patent Application Serial No. 14797124.6 (dated Aug. 2, 2018).
Notice of Allowance and Fee(s) Due for U.S. Appl. No. 15/134,338 (dated Mar. 27, 2018).

Communication of extended European Search Rerport for European Patent Application No. 14797124.6 (dated Nov. 28, 2016).
Notice of Allowance and Fee(s) Due for U.S. Appl. No. 14/229,789 (dated Oct. 27, 2016).
Communication of extended European Search Rerport for European Patent Application No. 14787952.2(dated Oct. 24, 2016).
Advisory Action, Examiner-Initiated Interview Summary, & AFCP 2.0 Decision for U.S. Appl. No. 14/229,789 (dated Jul. 25, 2016).
Applicant-Initiated Interview Summary for U.S. Appl. No. 14/229,789 (dated Jul. 11, 2016).
Final Office Action for U.S. Appl. No. 14/229,789 (dated May 6, 2016).
Communication of European publication number and information on the application of Article 67(3) EPC for European Application No. 14797124.6 (dated Feb. 24, 2016).
Communication of European publication number and information on the application of Article 67(3) EPC for European Application No. 14787952.2 (dated Feb. 3, 2016).
Notice of Allowance and Fee(s) Due for U.S. Appl. No. 14/280,319 (dated Jan. 13, 2016).
Non-Final Office Action for U.S. Appl. No. 14/280,319 (dated Sep. 15, 2015).
Non-Final Office Action for U.S. Appl. No. 14/229,789 (dated Sep. 15, 2015).
Notification of Transmittal of the International Search Report and the Written Opinion of the International Searching Authority for International Application No. PCT/US2014/038462 (dated Sep. 24, 2014).
Notification of Transmittal of the International Search Report and the Written Opinion of the International Searching Authority, or the Declaration for International Application No. PCT/US2014/035204 (dated Aug. 22, 2014).
Overview of 3GPP Release 10 V0.2.0 (Mar. 2014).
"LTE and LTE-A Products," Part No. 46891/580, Issue 3, pp. 1-16 (Jan. 2013).
"Infrastructure Test System, TM500 LTE-A, 3GPP LTE Test," Part No. 46900/003, Issue 1, pp. 1-8 (Oct. 2012).
"Aeroflex Launches TM500 LTE-A Test Mobile," http://www.evaluationengineering.com/news/aeroflex-launches-tm500-lte-a-test-mobile.php, p. 1 (Jul. 19, 2012).
"DCT2000 LTE UE Simulation API Manual," Release 17.1, Catapult Communications, pp. 1-106 (May 2009).
"Catapult Communications Announces High-Capacity LTE UE Simulation Test System," Catapult Communications Corporation, pp. 1-2 (Feb. 9, 2009).
"LTE (Long Term Evolution) Testing Systems," http://www.catapult.com/technologies/tech_lte.htm, pp. 1-2 (Jun. 26, 2008).
Notification of Transmittal of the International Search Report or the Declaration for International Application No. PCT/US02/16638 (dated Oct. 29, 2002).
"Universal Mobile Telecommunications (UMTS) Protocols and Protocol Testing," International Engineering Consortium, http://www.iec.org/online/tutorials/UMTS/topic04.html, pp. 1-3 (2001).
"Universal Mobile Telecommunications System (UMTS) Protocols and Protocol Testing," International Engineering Consortium, http://www.iec.org/online/tutorials/UMTS/topic02.html, pp. 1-7 (2001).
"Universal Mobile Telecommunications System (UMTS); UTRAN Iub Interface User Plane Protocols for Common Transport Channel Data Streams (3GPP TS 25.435 version 3.5.0 Release 1999)," ETSI TS 125 435 V3.5.0 (Dec. 2000).
"Universal Mobile Telecommunications System (UMTS); UTRAN Iub Interface Data Transport and Transport Signalling for Common Transport Channel Data Streams (3GPP TS 25.434 version 3.4.0 Release 1999)," ETSI TS 125 434 V3.4.0 (Dec. 2000).
"Universal Mobile Telecommunications System (UMTS); UTRAN Iub Interface NBAP Signalling (3GPP TS 25.433 version 3.4.1 Release 1999)," ETSI TS 125 433 V3.4.1 (Dec. 2000).
"Universal Mobile Telecommunications System (UMTS); UTRAN Iub/Iur Interface User Plane Protocol for DCH Data Streams (3GPP TS 25.427 version 3.5.0 Release 1999)," ETSI TS 125 427 V3.5.0 (Dec. 2000).

(56) References Cited

OTHER PUBLICATIONS

"Universal Mobile Telecommunications System (UMTS); UTRAN Iur and Iub Interface Data Transport; Transport Signalling for DCH Data Streams (3GPP TS 25.426 version 3.5.0 Release 1999)," ETSI TS 125 426 V3.5.0 (Dec. 2000).

"Universal Mobile Telecommunications System (UMTS); UTRAN Overall Description (3GPP TS 25.401 version 3.5.0 Release 1999)," ETSI TS 125 401 V3.5.0 (Dec. 2000).

"Universal Mobile Telecommunications System (UMTS); RRC Protocol Specification (3GPP TS 25.331 version 3.5.0 Release 1999)," ETSI TS 125 331 V3.5.0 (Dec. 2000).

"Universal Mobile Telecommunications System (UMTS); RLC protocol specification (3GPP TS 25.322 version 3.5.0 Release 1999)," ETSI TS 125 322 V3.5.0 (Dec. 2000).

"Universal Mobile Telecommunications System (UMTS); MAC protocol specification (3GPP TS 25.321 version 3.5.0 Release 1999)," ETSI TS 125 321 V3.6.0 (Dec. 2000).

Kwon et al., "Performance Comparison of RAN-CN Protocol Stacks in IMT-2000 Networks," IEEE, pp. 2370-2374 (2000).

Weiss, "Designing Macroscopic Diversity Cellular Systems," IEEE, pp. 2054-2058 (1999).

Lee et al., "Effect of Soft and Softer Handoffs on CDMA System Capacity," IEEE Transactions on Vehicular Technology, vol. 47, No. 3, pp. 830-841 (Aug. 1998).

Marchent et al., "Handover and Macro Diversity for 3rd Generation Mobile Systems within ATM Fixed Networks," IEEE, pp. 1151-1155 (1996).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0, pp. 1-79 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0, pp. 1-103 (Sep. 2011).

Non-Final Office Action for U.S. Appl. No. 09/866,955 (dated Dec. 31, 2013).

Commonly-assigned, co-pending U.S. Appl. No. 16/508,947 for "Methods, Systems, and Computer Readable Media for Testing Radio Access Network Nodes by Emulating Band-Limited Radio Frequency (RF) and Numerology-Capable UEs in a Wideband 5G Network," (Jul. 11, 2019).

Patriciello et al., "An E2E simulator for 5G NR networks," Simulation Modelling Practice and Theory, vol. 96, pp. 1-19 (2019).

"5G/NR—Frame Structure," ShareTechnote, pp. 1-22 (Jul. 8, 2019).

Giordani et al., "A Tutorial on Beam Management for 3GPP NR at mmWave Frequencies," arXiv:1804.01908v1 [cs.NI], pp. 1-22 (Apr. 5, 2018).

Keysight Technologies, "Testing 5G: Data Throughput—Application Note," Keysight, pp. 1-24 (Dec. 7, 2017).

Campos, "Understanding the 5G NR Physical Layer," Keysight Technologies, pp. 1-111 (Nov. 1, 2017).

\* cited by examiner

METHODS, SYSTEMS, AND COMPUTER READABLE MEDIA FOR TESTING LONG TERM EVOLUTION (LTE) AIR INTERFACE DEVICE USING EMULATED NOISE IN UNASSIGNED RESOURCE BLOCKS (RBS)

TECHNICAL FIELD

The subject matter described herein relates to testing air interface devices. More particularly, the subject matter described herein relates to testing air interface devices using emulated noise in unassigned resource blocks.

BACKGROUND

LTE radio access networks utilize base station nodes, referred to as evolved nodeBs (e-NodeBs or eNBs) for establishing bi-directional radio communications with mobile devices, referred to as user equipment (UEs), over an air interface. In practice each UE may be allocated one or more resource blocks (RBs) by the eNB for use in uplink (UE to eNB) communications and downlink (eNB to UE) communications. A resource block is a combination of symbols and subcarriers usable for carrying data between the eNB and the UE.

Figure 1:
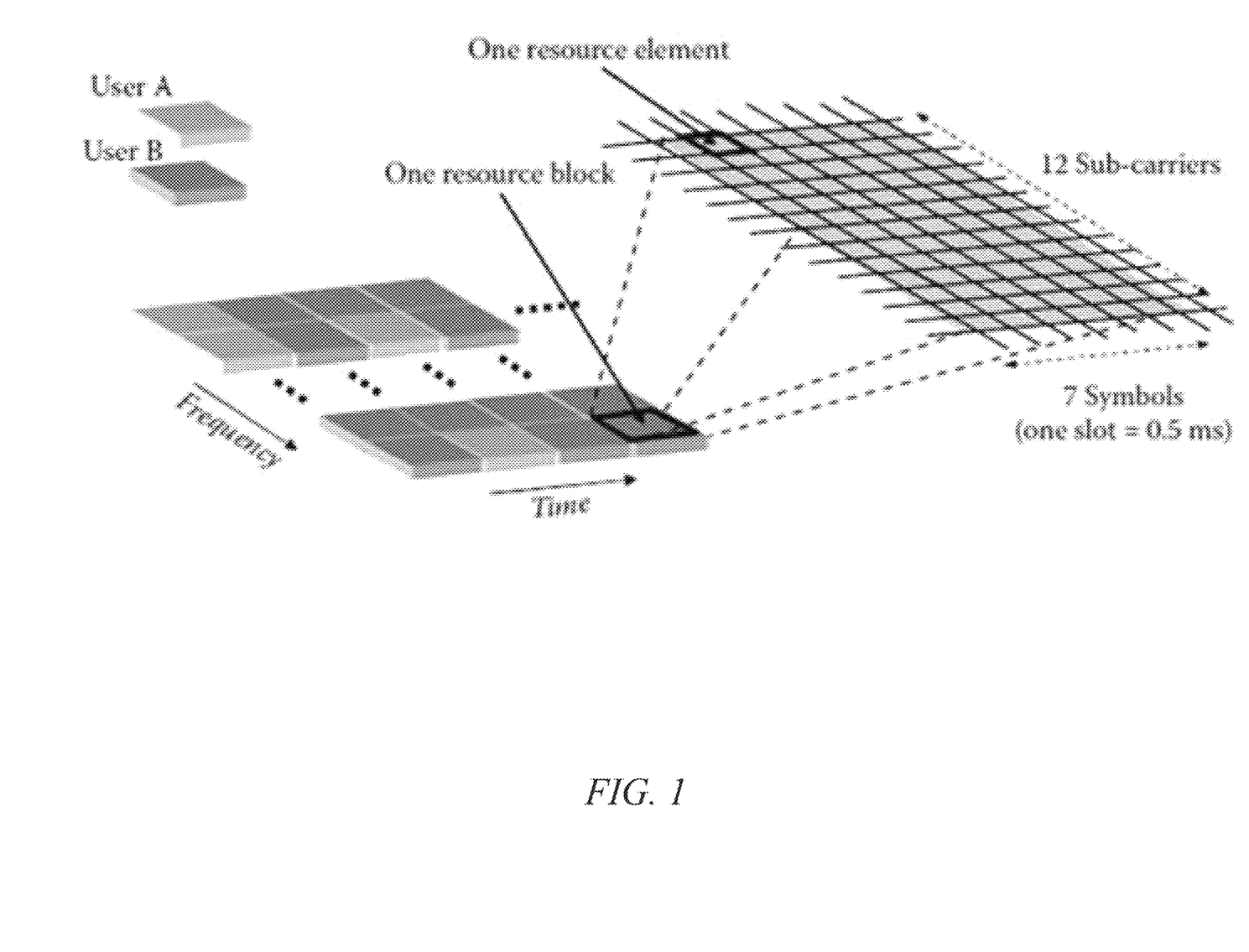
FIG. 1 is a block diagram illustrating exemplary LTE resource blocks and their assignments to UEs.

FIG. 1 illustrates an example of LTE resource blocks and assignment of the resource blocks to different users. In FIG. 1, one resource block is a unit of time and frequency that can be assigned to a user for uplink signal transmissions to an air interface device, such as an e-node B. Each resource block is divided into 7 symbols, represented by columns and 12 subcarriers, represented by rows. A resource element represented by an individual cell at the intersection of a symbol and a subcarrier. In the uplink direction, if a resource block is assigned to a particular UE, the resource block will carry data from the UE to the e-node B.

In the example illustrated in FIG. 1, all of the resource blocks are assigned to either User A or user B, which may correspond to UEs. These assignments are made by the e-Node B, communicated to the UEs in downlink signal transmissions, and instruct the UEs as to which resource blocks to use in uplink signal transmissions to the e-Node B. Each UE is responsible for decoding downlink signal transmissions from the e-Node B, identifying its resource block assignments, and transmitting to the e-Node B on the resource blocks to which the UE is assigned.

When the e-node B receives uplink signal transmissions from the UEs, the e-Node B monitors noise levels in the assigned resource blocks and uses the noise levels to make resource block assignments for subsequent uplink transmissions.

In a given uplink signal transmission, some resource blocks may be unassigned. For example, if one assigned resource block has a high level of noise, the e-Node B may deallocate assignment of the noisy resource block and assign another resource block to the UE. The process of monitoring and assigning resource blocks by the e-Node B is referred to as scheduling and is one of the most complex functions performed by an e-Node B.

Some uplink resource blocks may be unassigned in a particular uplink signal transmission. It is from these resource blocks that the e-Node B may assign to newly attached UEs or currently attached UEs that need new resource block assignments. Even though these unassigned resource blocks do not contain user data, the unassigned resource blocks may include noise. It is desirable to test how e-Node Bs schedule or assign UEs to unassigned resource blocks in the presence of noise in the unassigned resource blocks.

Accordingly, there exists a need for methods, systems, and computer readable media for testing air interface devices using emulated noise in unassigned RBs.

SUMMARY

A method for testing an air interface device using emulated noise in unassigned uplink resource blocks (RBs) includes, in a network equipment test device including at least one processor, receiving a first downlink signal transmission from an air interface device under test. The method further includes identifying unassigned uplink resource blocks. The method further includes transmitting an uplink signal to the air interface device under test with emulated channel noise in at least one of the unassigned uplink resource blocks. The method further includes receiving, after transmission of the uplink signal to the air interface device under test, a subsequent downlink signal transmission from the air interface device under test. The method further includes determining an effect of the emulated channel noise on resource block assignments.

A system for testing an air interface device using emulated noise in unassigned uplink resource blocks includes a network equipment test device. The network equipment test device includes at least one processor. The network equipment test device further includes a downlink signal decoder implemented by the at least one processor for receiving a first downlink signal transmission from an air interface device under test and identifying unassigned uplink resource blocks. The network equipment test device further includes an uplink signal generator including an unassigned resource block noise generator for generating emulated noise to be added/transmitted to at least one of the unassigned uplink resource blocks. The uplink signal generator transmits an uplink signal to the air interface device under test with emulated channel noise in the at least one of the unassigned uplink resource blocks. The network equipment test device further includes a scheduling assignment monitor for determining an effect of the emulated channel noise on resource block assignments.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 2:
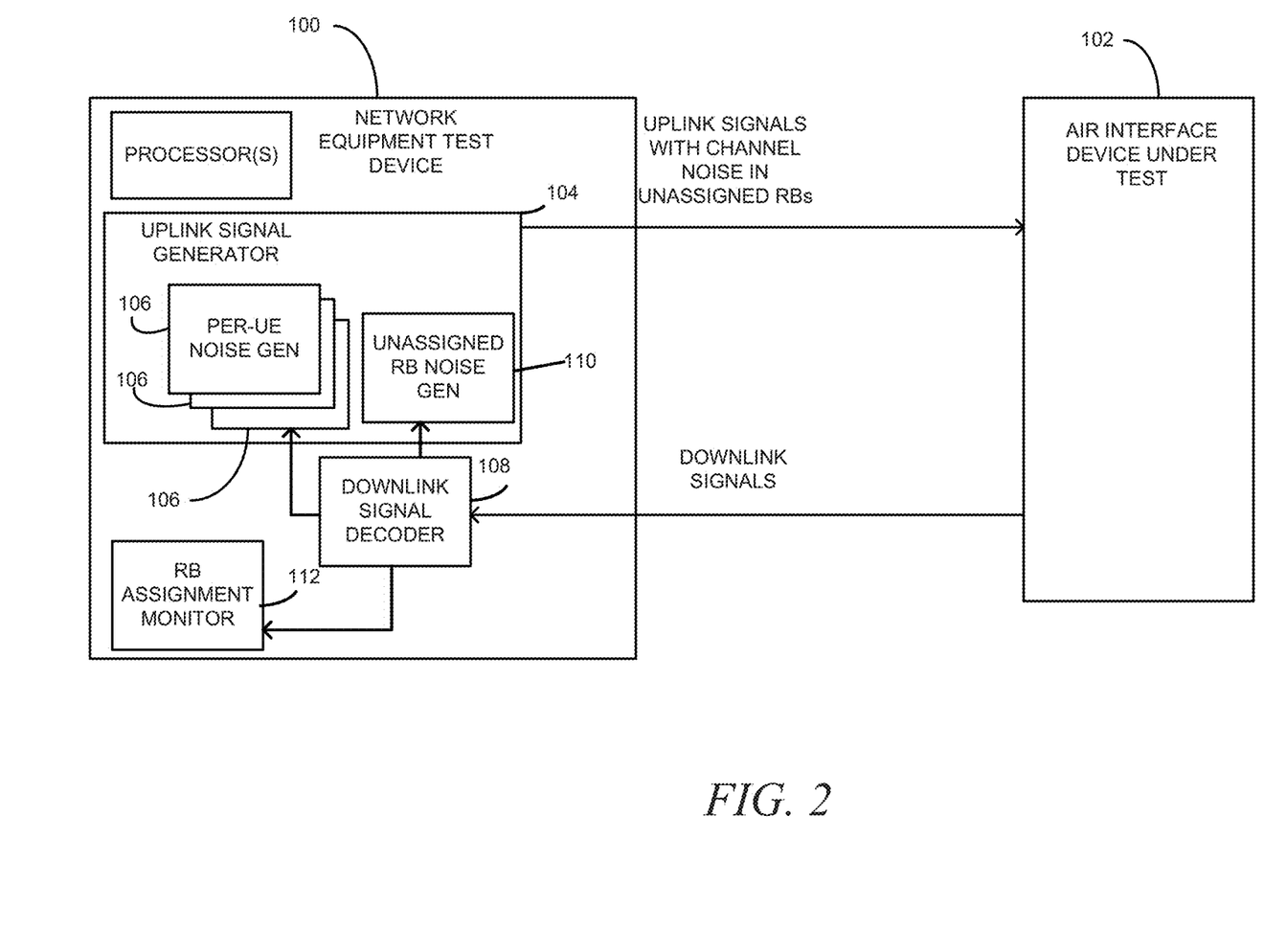
FIG. 2 is a block diagram illustrating an exemplary test environment for evaluating the effects of channel noise on unassigned resource block assignment.

The subject matter described herein includes methods, systems, and computer readable media for emulating noise in unassigned resource blocks and monitoring the effects of the noise on resource block assignment. Referring to FIG. 2, a network equipment test device 100 transmits signals to a device under test 102 to test the functionality and performance of the device under test. Device under test 102 may be a stationary air interface device, such as a Node B or an e-Node B.

Network equipment test device 100 may be a multi-UE emulator that simultaneously emulates multiple UEs, such as long term evolution (LTE) or LTE advanced UEs. In the illustrated example, network equipment test device 100 includes an uplink signal generator 104 for generating uplink signals from emulated UEs and for unassigned resource blocks with emulated channel noise to be transmitted to device under test 102. Uplink signal generator 104 may generate LTE, LTE advanced, and other uplink signals to test the functionality and performance of device under test 102. Uplink signal generator 104 may generate reference signals, control signals and data signals to emulated uplink transmissions by UEs.

Network equipment test device 100 further includes a plurality of per-UE channel noise generators 106 for generating and applying channel noise to uplink signals on a per-UE basis. In one example, per-UE channel noise generators may generate additive white Gaussian noise (AWGN) on a per-UE basis. Because channel noise is applied on a per-UE basis, different channel noise (such as different levels of channel noise) can be applied to signals from different UEs. As a result, the test environment generated by network equipment test device 100 more accurately simulates a real network environment where real channel noise is different per UE.

Network equipment test device 100 further includes a downlink signal decoder 108 for receiving downlink signal transmissions from air interface device under test 102, decoding the downlink signal transmissions, and identifying, from the downlink signal transmissions, assigned and unassigned uplink resource blocks. To determine uplink resource block assignments, downlink signal decoder 108 may be configured to decode downlink control information (DCI) for each emulated UE. Each emulated UE will have its own radio network temporary identifier (RNTI) value, which is known to downlink signal decoder 108 because downlink signal decoder 108 is a component of network equipment test device 100, which emulates the UEs. The RNTI value may be used to decode and extract downlink control information for a particular UE. However, downlink signal decoder 108 does not know which UEs' DCI information is present in a particular downlink signal transmission, and network equipment test device 100 may simultaneously emulate hundreds or thousands of UEs. As a result, the search space for determining which UEs' DCI is present in a downlink signal transmission is large. Downlink signal decoder 108 may use a process referred to as blind DCI decoding to decode the DCI information in the downlink signal to identify which UEs are scheduled in a particular downlink signal transmission and the uplink resource block assignments for the UEs scheduled in a particular uplink transmission. An exemplary blind decoding process that may be used by downlink signal decoder 108 to obtain DCI information from a downlink signal decoder is described in commonly assigned U.S. Pat. No. 9,204,325, the disclosure of which is incorporated herein by reference in its entirety.

Once downlink signal decoder 108 identifies all assigned resource blocks for the emulated UEs and any resource blocks assigned for reference signals or other non-UE control information, downlink signal decoder 108 may identify the remaining uplink resource blocks as unassigned resource blocks. Downlink signal decoder may communicate an indication of the assigned resource blocks to per-UE noise generators 106 and an indication of the unassigned resource blocks to an unassigned resource block noise generator 110. Unassigned resource block noise generator 110 generates emulated noise to be added to at least one of the unassigned uplink resource blocks. In one example, unassigned resource block noise generator 110 may assign different levels of emulated noise to different unassigned resource blocks.

As stated above, uplink signal generator 104 generates and transmits uplink signals to air interface device under test 102. The uplink signals include assigned resource blocks with per-UE emulated channel noise generated by per-UE noise generators 106 and unassigned resource blocks with per-RB noise generated by unassigned RB noise generator 110. Network equipment test device 100 further includes a resource block assignment monitor 112 for monitoring an effect of the emulated channel noise on resource block assignments. In one example, resource block assignment monitor 112 determines the effect of different levels of channel noise in different resource blocks on resource block assignment by air interface device under test 102. For example, unassigned RB noise generator 110 may generate a first level of emulated channel noise to be applied to resource block #1 and a second level of emulated channel noise to be applied to resource block #2, where the second level is greater than the first level. Uplink signal generator 104 may transmit the uplink signal to air interface device under test 102 with the different levels of emulated channel noise in unassigned resource blocks #1 and #2. Downlink signal decoder 108 may receive and decode a downlink signal from air interface device under test 102 and determine resource block assignments for the next uplink signal transmission. RB assignment monitor 112 may determine the effect of the emulated channel noise on unassigned resource block assignments and whether the effect corresponds to an expected assignment. For example, if unassigned resource block #2 contains more channel noise than unassigned resource block #1, air interface device under test 102 would be expected to preferentially assign a UE to resource block #1 over resource block #2. In such a case, RB assignment monitor 112 may generate output that indicates resource block assignments by air interface device under test 102 and whether or not the assignments correspond to expected assignments for previously unassigned resource blocks with different levels of emulated channel noise.

Figure 3:
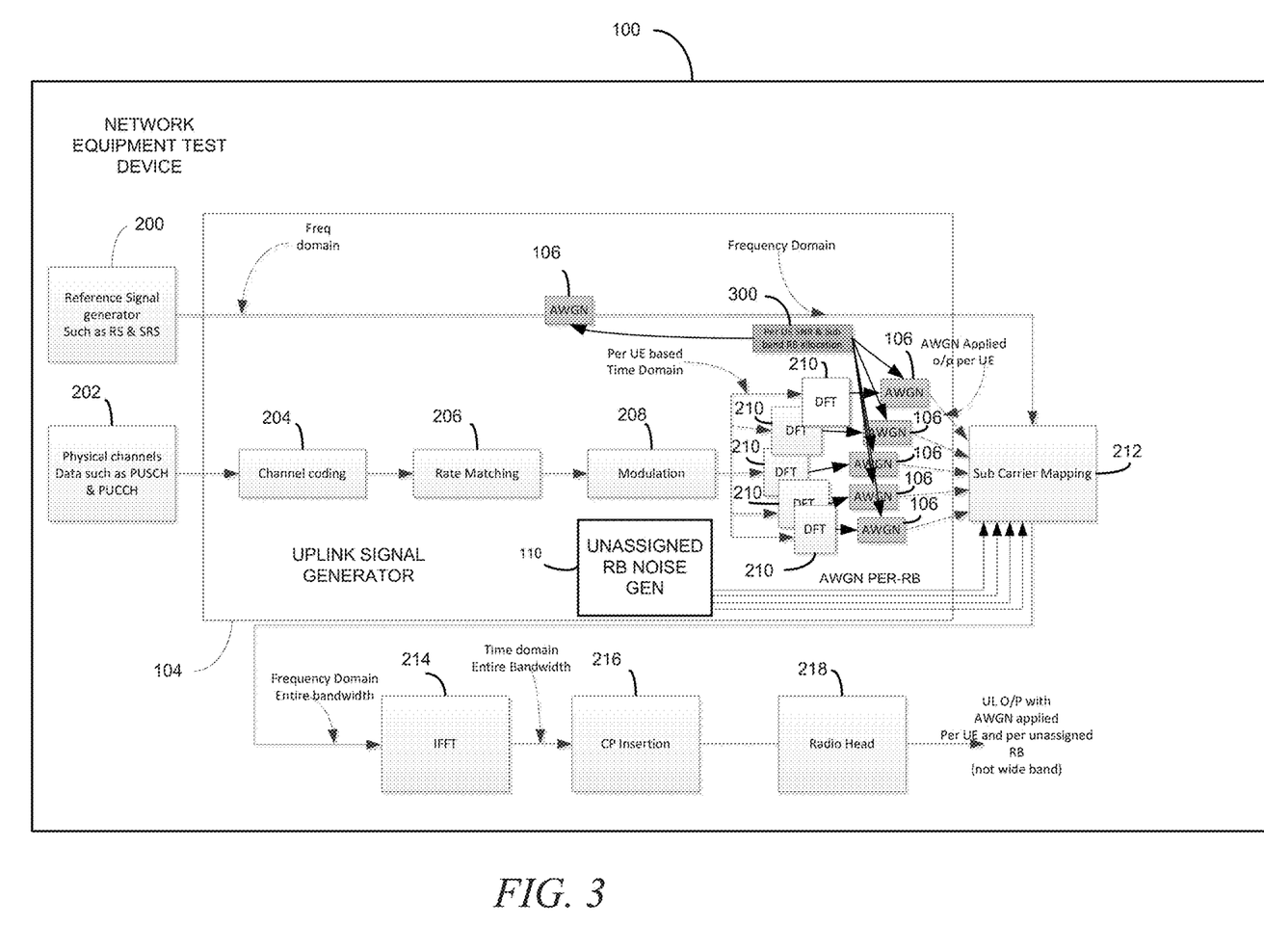
FIG. 3 is a block diagram illustrating an exemplary uplink signal chain architecture for emulating per-UE channel noise and noise in unassigned resource blocks.

FIG. 3 is a block diagram of an uplink signal chain architecture that may be implemented by a network equipment test device 100. Referring to FIG. 3, the uplink signal chain architecture includes a reference signal generator 200 for generating simulated UE reference signals and a physical channel generator 202 for generating physical uplink channels, such as the LTE physical uplink shared channel (PUSCH) and physical uplink control channel (PUCCH). The physical channels undergo by a channel coding module 204, rate matching by a rate matching module 206, modulation by a modulator 208, and discrete Fourier transform (DFT) processing by DFT modules 210 before the physical channels along with the reference signals undergo subcarrier mapping by a subcarrier mapping module 212, which maps the physical channels to subcarriers.

After subcarrier mapping, the entire uplink signal is in the frequency domain. However, the signal must be converted to the time domain before being transmitted over the air interface. Accordingly, the signal undergoes inverse fast Fourier transform (IFFT) by inverse FFT module 214 and cyclic prefix (CP) insertion by CP insertion module 216 before the signal is provided to radio head 218 and then either transmitted wirelessly over the air interface to a device under test or over an emulated air interface using cables to the device under test.

Per-UE channel noise generators 106 generate and apply per-UE channel noise to the uplink signal for selected emulated UEs. Per-UE channel noise generators 106 generate and apply UE-specific channel noise to the frequency domain uplink signals after discrete Fourier transform processing but prior to subcarrier mapping. Thus, the per-UE channel noise is applied at baseband in the frequency domain to the UE-specific signals. In addition, per-UE channel noise is also applied to the reference signal for each UE.

Because the resources for generating and applying UE-specific channel noise to different UEs may be independent from each other, per-UE channel noise for one UE can be generated and applied to the uplink signal for the one UE simultaneously with the generation and application of different per-UE channel noise to the uplink signal for another UE. For example, the emulated channel noise power level for one UE may be set based on the signal power level and desired SNR for that UE, while the emulated channel noise power level for another UE may be set based on a different signal power level and a different desired SNR for that UE. The desired SNR and signal power levels may be parameters that are input by the test administrator. The generation and addition of the simulated noise signals to the uplink signals for two or more UEs may occur simultaneously.

A per-UE SNR and sub-band resource block allocation module 300 may receive the user input for the desired SNR and signal power level and provide or make the parameters available to per-UE channel noise generators 106. Both the signal power level and the desired SNR may be set differently for different UEs. In addition, the signal power level for a particular UE may be fixed for the duration of a test or may vary during a test. In the case where the signal power level varies, per-UE channel noise generators 106 may vary the noise power level to maintain the desired SNR for the UE. Sub-band resource block allocation module 300 may also indicate to each per-UE noise generator 106 in which sub band the resource blocks for a particular UE will occur so that per-UE noise generators 106 will know in which resource block(s) noise should be added for a particular UE.

Unassigned resource block noise generator 110 generates emulated per-resource block channel noise to be applied to unassigned uplink resource blocks. The emulated channel noise is provided to subcarrier mapping module 212, maps the generated channel noise to selected unassigned resource blocks in the frequency domain for the entire transmit bandwidth. Subcarrier mapping module 212 provides the frequency domain entire bandwidth signal to inverse fast Fourier transform module 214. Inverse fast Fourier transform module 214 converts the signal to the time domain and provides the time domain signal to CP insertion module 216. CP insertion module 216 performs cyclic prefix insertion for the uplink signal and provides the signal to radio head 218, which transmits the signal to air interface device under test 102.

Figure 4:
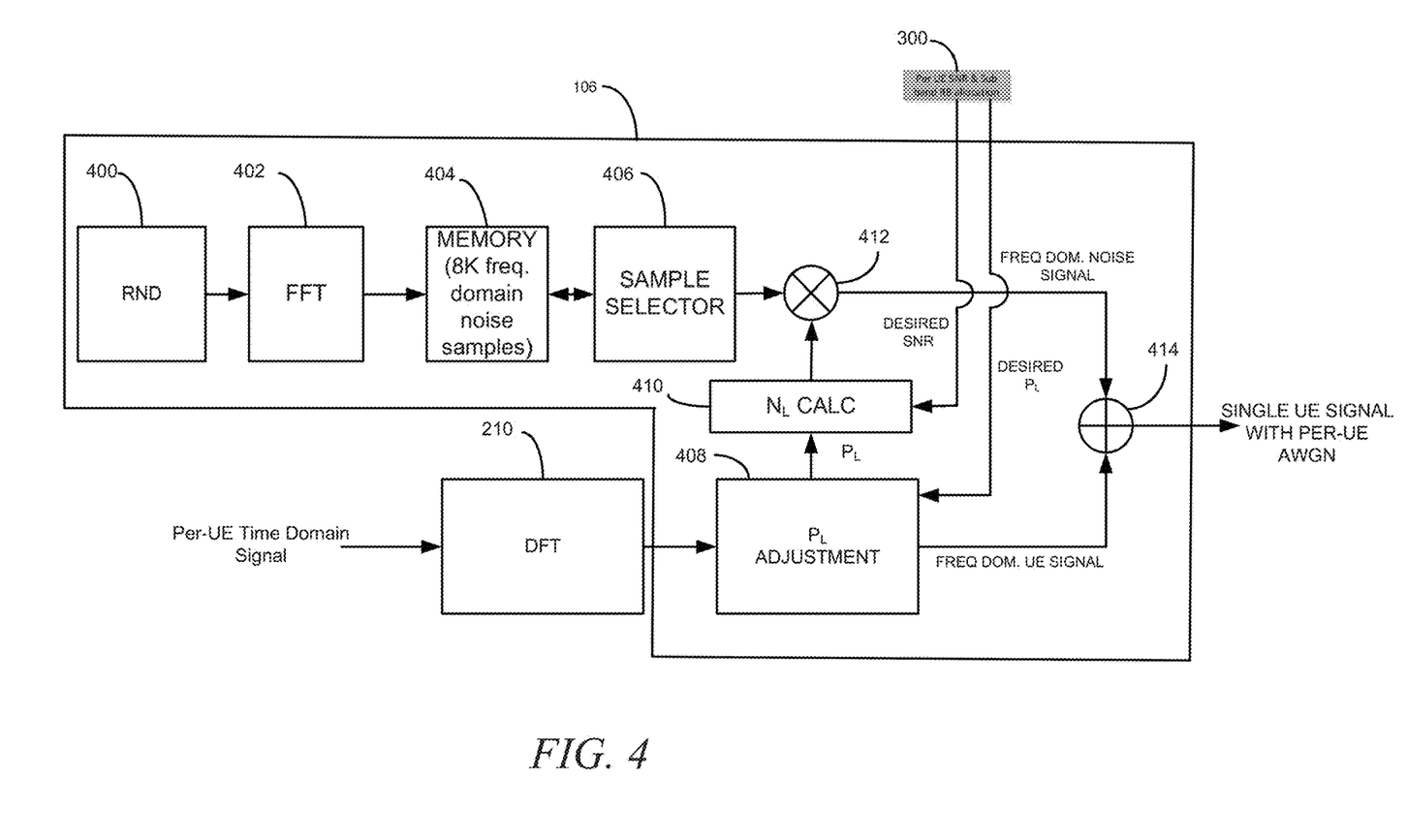
FIG. 4 is a block diagram illustrating an exemplary architecture for a per-UE uplink signal noise generator.

FIG. 4 is a block diagram illustrating an exemplary internal architecture of per-UE channel noise generator 106 according to an embodiment of the subject matter described herein. Referring to FIG. 3, per-UE channel noise generator 106 includes a random signal generator 400 that generates a random time domain signal. The power level of the signal may be set for peak noise generation. A fast Fourier transform block 402 converts the random time domain signal to the frequency domain and stores frequency domain noise signal samples in memory 404. In the illustrated example, 8000 frequency domain samples are stored due to limited memory resources but randomized among these stored samples per UE basis and per subframe basis. However, the subject matter described herein is not limited to storing 8000 samples. More or fewer samples may be stored depending on available memory resources and processing power.

A sample selector 406 selects samples from memory 404 at random to be mixed with the uplink signal. Selecting the samples at random reduces the occurrence of patterns in the per-UE noise signal.

A power level adjustment module 408 receives the frequency domain uplink signal and the desired signal power level and adjusts the frequency domain signal accordingly. A noise power level calculation block 410 receives as input the desired SNR for a particular UE and either the desired signal power level or the actual signal after adjustment and calculates the noise power level needed to achieve the SNR using the following equation:

$$SNR = \frac{P_L}{N_L} \quad (1)$$

where SNR is the signal to noise ratio, $F_L$ is the desired signal power level, and $N_L$ is the desired noise power level. Solving Equation 1 for $N_L$, the noise power level can be determined by the following equation:

$$N_L = \frac{P_L}{SNR} \quad (2)$$

If the desired signal power level is fixed for the duration of a test, Equation 2 can be calculated once, and the value determined for $N_L$ for the UE can be used for the duration of the test. If the desired signal power level is variable, Equation 2 can be used to continually calculate and update the value for $N_L$ for the UE during the test.

Once the value for $N_L$ is determined, the value may be input to a mixer or multiplier 412, which multiplies the noise signal sample by the calculated noise power level $N_L$. The power adjusted noise sample is added via adder 414 to the power adjusted signal output from adjuster 408. The resulting output signal is an uplink signal with additive per-UE channel noise.

Figure 5:
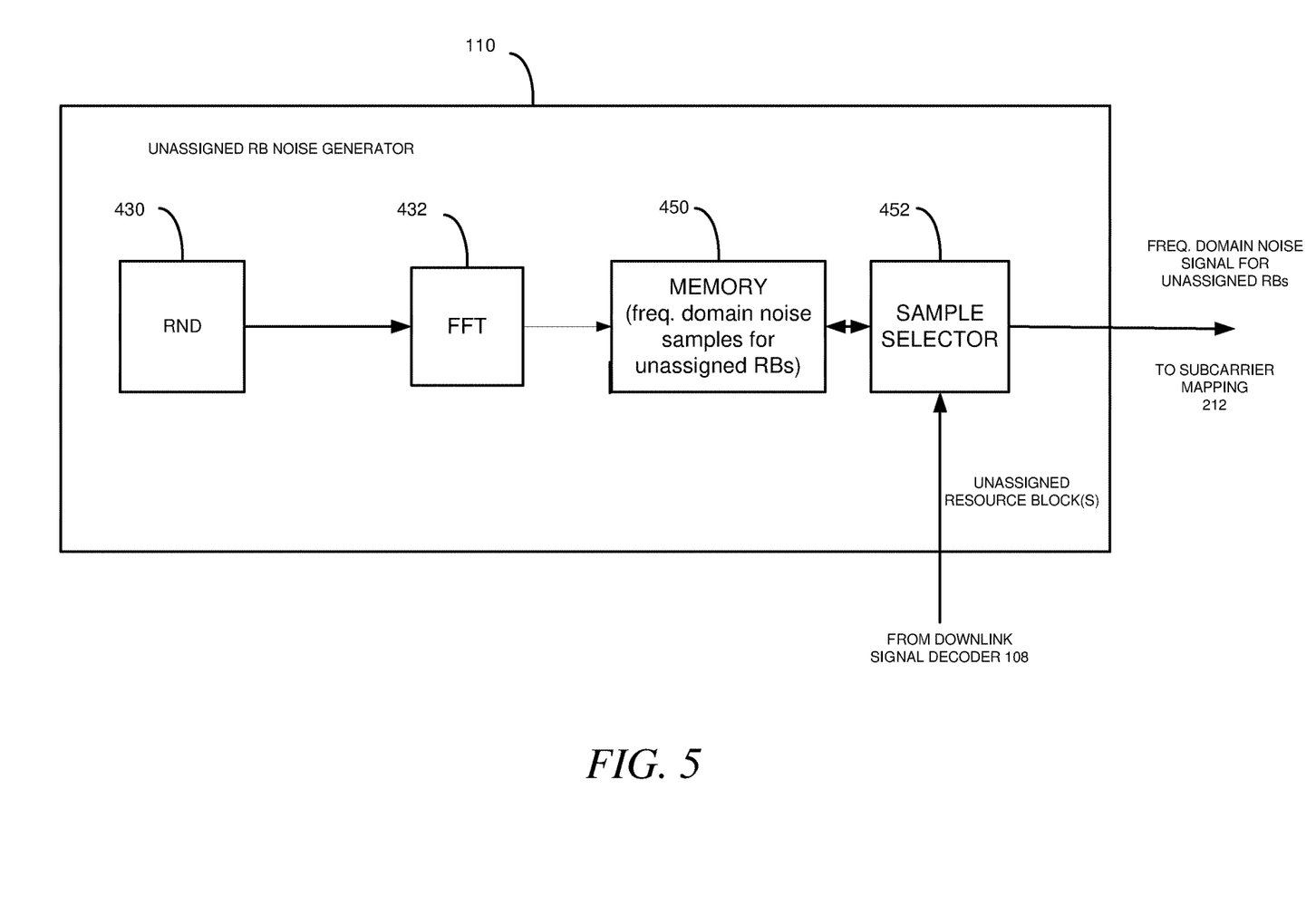
FIG. 5 is a block diagram illustrating an exemplary architecture for an unassigned RB noise generator.

FIG. 5 is a block diagram illustrating an exemplary architecture for unassigned RB noise generator 110. Referring to FIG. 5, unassigned RB noise generator 110 includes a random signal generator 430 that generates a random time domain signal. The power level of the signal may be set for peak noise generation. A fast Fourier transform block 432 converts the random time domain signal to the frequency domain and stores frequency domain noise signal samples in memory 450 to be added to selected unassigned RBs. Unassigned RB noise generator 110 further includes a sample selector 452 that receives an indication of unassigned resource blocks from downlink signal decoder 108 and selects noise samples from memory 450 to be added to specific unassigned uplink resource blocks. The samples and the resource blocks may be selected by a user to implement any of the examples described herein where noise in unassigned resource blocks is used to cause the air interface device under test to react to the noise in making uplink signal resource block assignments. The output of sample selector 452 is frequency domain noise signal samples for specific unassigned uplink resource blocks.

Returning to FIG. 3, after the per-UE channel noise and unassigned RB channel noise are added to the uplink signals, the signals undergo subcarrier mapping by subcarrier mapping module 212, inverse FFT processing by inverse FFT module 214, CP insertion, by CP insertion module 216, and transmission over the air to the device under test by radio head 218. It should be noted that radio head 218 functions as an interface tor transmitting the test signals to a device under test. In an alternate embodiment, radio head 218 may be omitted from the test, and the signals may be transmitted to the device under test over a wired interface, such as a wired common public radio (CPRI) interface.

Figure 6:
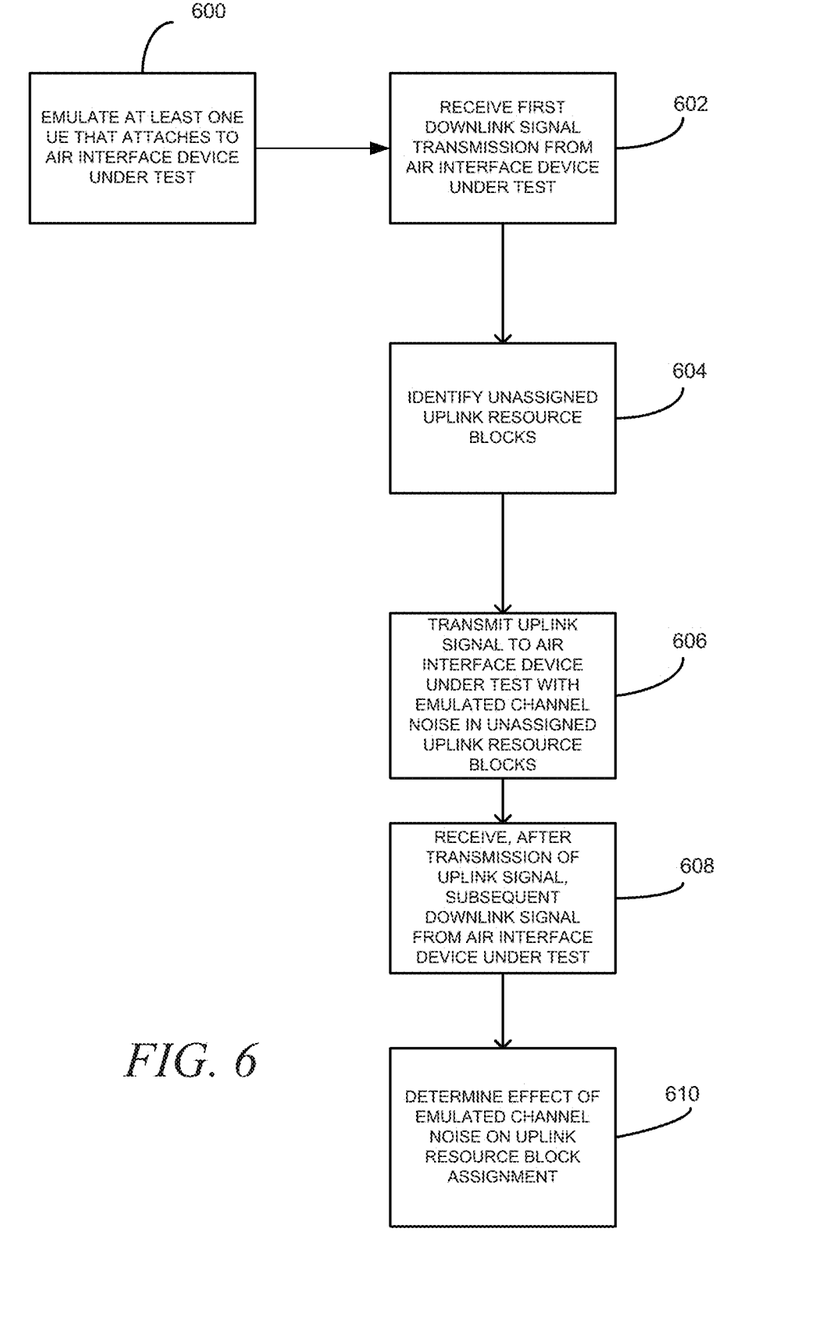
FIG. 6 is a flow chart illustrating an exemplary process for testing an air interface device by adding emulated channel noise in unassigned uplink resource blocks.

FIG. 6 is a flow chart illustrating exemplary steps for testing an air interface device using emulated noise in unassigned uplink resource blocks. Referring to FIG. 6, in step 600, the method includes emulating at least one UE that connects and attaches to an air interface device under test. For example, network equipment test device 100 may emulate plural UEs that generate and send attachment requests to air interface device 102.

In step 602, the method further includes receiving a first downlink signal transmission from an air interface device under test. For example, downlink signal decoder 108 may receive downlink signals from air interface device under test 102. The downlink signals may include uplink resource block assignments for the next uplink signal to be transmitted to air interface device under test 102.

In step 604, the method further includes identifying unassigned uplink resource blocks. For example, downlink signal decoder 108 may decode downlink control information (DCI) in the downlink signal and identify uplink resource blocks that are assigned to UEs and to control information. The resource blocks that are not assigned to UEs or to control information may be identified as unassigned resource blocks. The identifying of unassigned uplink resource blocks may also be effected by monitoring of uplink signal transmissions.

In step 606, the method further includes transmitting an uplink signal to the air interface device under test with emulated channel noise in at least one of the unassigned resource blocks. For example, unassigned resource block noise generator 110 may receive an indication of unassigned uplink resource blocks from downlink signal decoder 108 and select noise samples to be added to specific unassigned uplink resource blocks in order to implement a desired test scenario.

In step 608, the method further includes receiving, after transmission of the uplink signal to the air interface device under test, a subsequent downlink signal transmission from the air interface device under test. For example, downlink signal decoder 108 may receive a downlink signal from air interface device under test 102 in response to the previously transmitted uplink signal with emulated noise in unassigned resource blocks.

In step 610, the method further includes determining an effect of the emulated channel noise in the unassigned resource blocks on resource block assignments. For example, downlink signal decoder 108 may provide an indication of assigned and/or unassigned resource blocks to RB assignment monitor 112. RB assignment monitor 112 may output data, such as a report, that indicates which uplink resource blocks had emulated channel noise and how that noise affected subsequent resource block assignments in the resource blocks with emulated channel noise. Determining the effect of the emulated channel noise in unassigned resource blocks may also be effected by monitoring uplink signal transmissions by RB assignment monitor 112.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing an air interface device using emulated noise in unassigned uplink resource blocks (RBs), the method comprising:
   in a network equipment test device including at least one processor:
   receiving a first downlink signal transmission from an air interface device under test;
   identifying uplink resource blocks that are assigned to UEs and unassigned uplink resource blocks that are not assigned to any UEs;
   providing a plurality of per-UE channel noise generators that generate and apply per-UE channel noise to the uplink signal for selected emulated UEs in the uplink resource blocks that are identified as being assigned to the UEs;
   providing an unassigned resource block noise generator separate from the per-UE noise generators that generates emulated per-resource block channel noise to be applied to the unassigned uplink resource blocks that are identified as not being assigned to any UEs;
   transmitting an uplink signal to the air interface device under test with the emulated per-resource block channel noise in at least one of the unassigned uplink resource blocks that are identified as not being assigned to any UEs and the per-UE channel noise in at least one of the uplink resource blocks that are identified as being assigned to the UEs;
   receiving, after transmission of the uplink signal to the air interface device under test, a subsequent downlink signal transmission from the air interface device under test; and
   determining an effect of the emulated channel noise on resource block assignments, wherein determining an effect of the emulated channel noise on the resource block assignments includes determining whether the air interface device under test assigns any newly-attached UEs to the unassigned uplink resource blocks with the emulated per-resource-block channel noise.

2. The method of claim 1 wherein the air interface device under test comprises an evolved nodeB (e-nodeB).

3. The method of claim 1 wherein identifying unassigned uplink resource blocks includes decoding downlink control information (DCI) in the first downlink signal transmission and identifying, from the DCI, uplink resource blocks that are not assigned to user equipment (UEs).

4. The method of claim 1 wherein transmitting an uplink signal to the air interface device under test includes applying user-specified levels of emulated channel noise to at least some of the unassigned uplink resource blocks.

5. The method of claim 1 wherein transmitting an uplink signal to the air interface device under test includes applying different levels of emulated channel noise to different unassigned uplink resource blocks.

6. The method of claim 5 wherein determining an effect of the emulated channel noise on the resource block assignments includes determining whether the air interface device under test assigns UEs to unassigned uplink resource blocks with lower levels of emulated channel noise.

7. The method of claim 1 wherein determining an effect of the emulated channel noise on the resource block assignments includes:
obtaining downlink control information (DCI) from the subsequent downlink signal transmission;
determining, from the DCI, which of the unassigned uplink resource blocks identified from the first downlink signal transmission are assigned to UEs.

8. The method of claim 1 wherein transmitting the uplink signal to the air interface device under test comprises applying emulated per-user equipment (UE) channel noise to assigned uplink resource blocks in the uplink signal.

9. The method of claim 1 wherein the emulated channel noise comprises additive white Gaussian noise (AWGN).

10. A system for testing an air interface device using emulated noise in unassigned uplink resource blocks (RBs), the system comprising:
a network equipment test device including:
at least one processor;
a downlink signal decoder implemented by the at least one processor for receiving a first downlink signal transmission from an air interface device under test and identifying uplink resource blocks that are assigned to UEs and unassigned uplink resource blocks that are not assigned to any UEs;
an uplink signal generator including a plurality of per-UE channel noise generators that generate and apply per-UE channel noise to the uplink signal for selected emulated UEs in the uplink resource blocks that are identified as being assigned to the UEs;
an unassigned resource block noise generator separate from the per-UE channel noise generators that generates emulated per-resource-block channel noise to be applied to the unassigned uplink resource blocks that are identified as not being assigned to any UEs; and
a scheduling assignment monitor for determining, from a subsequent downlink signal transmission received after the transmission of the uplink signal to the air interface device under test, an effect of the emulated channel noise on resource block assignments, wherein determining an effect of the emulated channel noise on the resource block assignments includes determining whether the air interface device under test assigns any newly-attached UEs to the unassigned uplink resource blocks with the emulated per-resource-block channel noise.

11. The system of claim 10 wherein the air interface device under test comprises an evolved nodeB (e-nodeB).

12. The system of claim 10 wherein identifying unassigned uplink resource blocks includes decoding downlink control information (DCI) in the first downlink signal transmission and identifying, from the DCI, uplink resource blocks that are not assigned to user equipment (UEs).

13. The system of claim 10 wherein transmitting an uplink signal to the air interface device under test includes applying user-specified levels of emulated channel noise to at least some of the unassigned uplink resource blocks.

14. The system of claim 10 wherein transmitting an uplink signal to the air interface device under test includes applying different levels of emulated channel noise to different unassigned uplink resource blocks.

15. The system of claim 14 wherein determining an effect of the emulated channel noise on the resource block assignments includes determining whether the air interface device under test assigns UEs to unassigned uplink resource blocks with lower levels of emulated channel noise.

16. The system of claim 10 wherein determining an effect of the emulated channel noise on the resource block assignments includes: obtaining downlink control information (DCI) from the subsequent downlink signal transmission;
determining, from the DCI, which of the unassigned uplink resource blocks identified from the first downlink signal transmission, have been assigned to UEs.

17. The system of claim 10 wherein transmitting the uplink signal to the air interface device under test comprises applying emulated per-user equipment (UE) channel noise to assigned uplink resource blocks in the uplink signal.

18. The system of claim 10 wherein the emulated channel noise comprises additive white Gaussian noise (AWGN).

19. A non-transitory computer readable medium having stored thereon executable instructions that when executed by the processor of a computer control the computer to perform steps comprising:
receiving a first downlink signal transmission from an air interface device under test;
identifying uplink resource blocks that are assigned to UEs and unassigned uplink resource blocks that are not assigned to any UEs;
providing a plurality of per-UE channel noise generators that generate and apply per-UE channel noise to the uplink signal for selected emulated UEs in the uplink resource blocks that are identified as being assigned to the UEs;
providing an unassigned resource block noise generator separate from the per-UE noise generators that generates emulated per-resource block channel noise to be applied to the unassigned uplink resource blocks that are identified as not being assigned to any UEs;
transmitting an uplink signal to the air interface device under test with the emulated per-resource block channel noise in at least one of the unassigned uplink resource blocks that are identified as not being assigned to any UEs and the per-UE channel noise in at least one of the uplink resource blocks that are identified as being assigned to the UEs;
receiving, after transmission of the uplink signal to the air interface device under test, a subsequent downlink signal transmission from the air interface device under test; and
determining an effect of the emulated channel noise on resource block assignments, wherein determining an effect of the emulated channel noise on the resource block assignments includes determining whether the air interface device under test assigns any newly-attached UEs to the unassigned uplink resource blocks with the emulated per-resource-block channel noise.

20. The non-transitory computer readable medium of claim 19 wherein determining an effect of the emulated channel noise on the resource block assignments includes:
   obtaining downlink control information (DCI) from the subsequent downlink signal transmission; and
   determining, from the DCI, which of the unassigned uplink resource blocks identified from the first downlink signal transmission, are assigned to UEs.

* * * * *